(12) United States Patent
Moore et al.

(10) Patent No.: US 9,085,287 B2
(45) Date of Patent: Jul. 21, 2015

(54) VEHICLE STOPPING DISTANCE IMPROVEMENTS

(75) Inventors: Ian Moore, Pulheim (DE); Thomas Svensson, Leichlingen (DE); Rudolf Daniels, Wermelskirchen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 151 days.

(21) Appl. No.: 13/572,638

(22) Filed: Aug. 11, 2012

(65) Prior Publication Data

US 2013/0066533 A1 Mar. 14, 2013

(30) Foreign Application Priority Data

Aug. 11, 2011 (DE) .................. 10 2011 080 825

(51) Int. Cl.
*B60T 8/176* (2006.01)
*B60T 8/1761* (2006.01)
*B60T 8/44* (2006.01)
*B60T 13/66* (2006.01)

(52) U.S. Cl.
CPC ............. *B60T 8/176* (2013.01); *B60T 8/17616* (2013.01); *B60T 8/447* (2013.01); *B60T 13/662* (2013.01)

(58) Field of Classification Search
CPC ....... B60T 7/12; B60T 8/175; B60T 8/17616; B60T 8/17636; B60T 8/1755
USPC .......................................................... 701/78
See application file for complete search history.

(56) References Cited

U.S. PATENT DOCUMENTS 5,344,220 A * 9/1994 Roll et al. .................. 303/9.64
7,891,746 B2 * 2/2011 Nakayama et al. .......... 303/9.64

(Continued)

OTHER PUBLICATIONS

"Anti-lock_braking_system"; http://en.wikipedia.org/wiki/Anti-lock_braking_system; retrieved: Dec. 31, 2013.*

(Continued)

*Primary Examiner* — James Trammell
*Assistant Examiner* — James E Stroud
(74) *Attorney, Agent, or Firm* — Joseph E. Root

(57) ABSTRACT

A method for reducing the braking distance for a vehicle having an anti-lock braking mechanism (ABS) and a hydraulic braking system detects a brake pressure requested by the vehicle's driver ($P_{requested}$), and calculates the brakes pressure values at which the wheels of the vehicle lock. A maximum brake pressure value of these different brake pressure values is then compared with the driver's requested brake pressure value ($P_{requested}$). If the requested brake pressure value is much higher than the maximum brake pressure value, then the actual brake pressure applied at different wheels ($P_{actual}$) is set to a level below the requested brake pressure ($P_{requested}$), but still higher than the maximum brake pressure value. This reduces the amount of work required to be done by the ABS in pumping the excessive brake fluid out of the braking system of the vehicle, and allows for precise control of ABS mechanism during wheel slip conditions.

3 Claims, 3 Drawing Sheets

(56) References Cited

U.S. PATENT DOCUMENTS

| | | | | |
|---|---|---|---|---|
| 2007/0216224 A1* | 9/2007 | Schmitt et al. | | 303/191 |
| 2010/0283315 A1* | 11/2010 | Isono | | 303/9.75 |
| 2010/0292049 A1* | 11/2010 | Petersson | | 477/188 |
| 2010/0292898 A1* | 11/2010 | Stoehr | | 701/48 |
| 2010/0308646 A1* | 12/2010 | Shimizu | | 303/116.2 |

OTHER PUBLICATIONS

"Anti-lock_braking_system_for_motorcycles"; http://en.wikipedia.org/wiki/Anti-lock_braking_system_for_motorcycles; retrieved: Dec. 31, 2013.*

"Anti-lock_braking_system Nov. 19, 2009"; http://web.archive.org/web/20091119101846/http://en.wikipedia.org/wiki/Anti-lock_braking_system; retrieved: Dec. 30, 2013.*

"Anti-lock_braking_system Jul. 13, 2004"; http://web.archive.org/web/20040713155349/http://en.wikipedia.org/wiki/Anti-lock_braking_system; retrieved: Dec. 30, 2013.*

"Anti-lock_braking_system Jan. 24, 2010"; http://web.archive.org/web/20100124232830/http://en.wikipedia.org/wiki/Anti-lock_braking_system; retrieved: Dec. 30, 2013.*

"Real-Time_computing Jan. 25, 2010"; http://web.archive.org/web/20100125025435/http://en.wikipedia.org/wiki/Real-time_computing; retrieved: Dec. 30, 2013.*

* cited by examiner

VEHICLE STOPPING DISTANCE IMPROVEMENTS

TECHNICAL FIELD

The present disclosure generally relates to braking systems for vehicles, and, more specifically, to a method and a system for reducing braking distance for a vehicle equipped with a hydraulic braking system.

BACKGROUND

Braking distance of a vehicle is defined as the distance travelled by a vehicle after applying the brakes, until the vehicle is stationary. Each vehicle travels a specific braking distance before halting completely, and this distance depends on many factors, including the vehicle's braking system, the quality of the vehicle's tires, the size and the type of the vehicle, and the adhesion between the tires and the road surface. In many regions around the globe, including North America and Europe, the braking distance of a vehicle gains significant media attention. Automobile manufacturers have been continuously endeavoring to reduce the braking distance for the vehicles they manufacture, through different methods. Successful attempts in this respect are continuously published by the media.

For vehicles equipped with an anti-lock braking system (ABS), one possible way of reducing the braking distance is careful and selective tuning of the ABS. Those in the art understand that conventional ABS prevents wheel lock during braking, and substantially reduces the stopping distance on many road surfaces. A typical ABS in a vehicle is activated when the brake pressure requested by the vehicle's driver exceeds the brake pressure which results in 100% adhesion utilization. However, in case of slippery low friction surfaces, the ABS needs to be more finely modulated, to finely tune the brake pressure, and reduce it to a level where the wheels can still rotate on the surface.

Considering the aforementioned problems, a need exists for a system and method that can reduce the braking distance for a vehicle equipped with a hydraulic braking system.

SUMMARY

The present disclosure provides a system and method for substantially reducing the braking distance for a vehicle having a hydraulic braking system. The method and the system are compatible with any type of vehicle, including cars, SUVs, trucks, etc.

In one aspect, the present disclosure provides a method for reducing the braking distance of a vehicle having a hydraulic braking system. The braking system includes a brake master cylinder coupled to an electronic control unit, and an anti-lock braking system (ABS). To stop the vehicle, the driver of the vehicle applies the brakes and requests a specific amount of brake pressure. The method determines whether the brake pressure requested by the vehicle's driver exceeds a wheel lock brake pressure at which at least one of the vehicle's wheels locks up. If the requested brake pressure exceeds this value, then the method electromechanically activates the brake master cylinder, to reduce the brake pressure produced by the brake master cylinder to a value lower than the brake pressure requested by the driver. During the brake pressure reduction by the brake master cylinder, the method still maintains the brake pressure to a level higher than the wheel lock brake pressure. Specifically, the method alters the actual brake pressure at the wheel brakes of the vehicle, on identifying that the brake pressure requested by the vehicle's driver is higher than the brake pressure at which the wheels lock up.

In another aspect, the present disclosure provides a vehicle having a hydraulic braking system. The braking system includes a brake master cylinder, an electronic ECU with an ABS function, coupled to the brake master cylinder. As the vehicle's driver applies the brakes, the electronic control unit checks whether the brake pressure requested by the driver exceeds the value at which at least one of the wheels of the vehicle locks up. If it exceeds, then the electronic control unit reduces brake pressure produced by the brake master cylinder, but still keeps it at a value higher than the brake pressure at which the wheel locks up.

The method and the system of the present disclosure reduce the brake distance of a vehicle, especially on low friction surfaces. Further, the ABS of the vehicle needs to do less work in controlling wheel slip.

Additional aspects, advantages, features and objects of the present disclosure will be made apparent from the drawings and the detailed description of the illustrative embodiments construed in conjunction with the appended claims that follow.

DETAILED DESCRIPTION OF ILLUSTRATIVE EMBODIMENTS

The following detailed description elucidates aspects of the disclosure and the ways it can be implemented. However, the description does not define or limit the invention, such definition or limitation being solely contained in the claims appended thereto. Although the best mode of carrying out the invention has been disclosed, those in the art would recognize that other embodiments for carrying out or practicing the invention are also possible.

Braking distance for a vehicle refers to the distance travelled by the vehicle, after the brakes are applied, until the vehicle is stationary. The braking distance may depend on the size and type of vehicle, the kind of braking system that the vehicle is equipped with, the quality of the vehicle's tires, the adhesion between the tire and the road surface, and the initial velocity of the vehicle before applying the brakes.

Currently, the braking mechanism in many vehicles incorporates an anti-lock braking system (ABS). An ABS allows the wheels of a vehicle to keep turning, and reduces the braking distance of a vehicle by preventing the wheels from locking up. The ABS generally includes an electronic control unit and wheel speed sensors. Through the wheel speed sensors, the electronic control unit (ECU) continuously monitors the rotational speed of each wheel of the vehicle, to detect conditions of an impending wheel lock. If such a condition is detected, the ECU reduces the brake pressure at the affected wheel, to prevent the wheel from locking ABS is quite effective in reducing the braking distance of a vehicle on any road surface. However, on smooth slippery surfaces, the ABS braking distance for a vehicle can sometimes significantly increase, as compared to a high friction road surface. A careful and selective tuning of the ABS of a vehicle can reduce the braking distance of the vehicle even further.

The present disclosure unveils a method and a system for reducing the braking distance for a vehicle equipped with a hydraulic braking system, by carefully monitoring the brake pressure requested by the vehicle's driver and altering the actual brake pressure produced at the different wheels of the vehicle.

Figure 1:
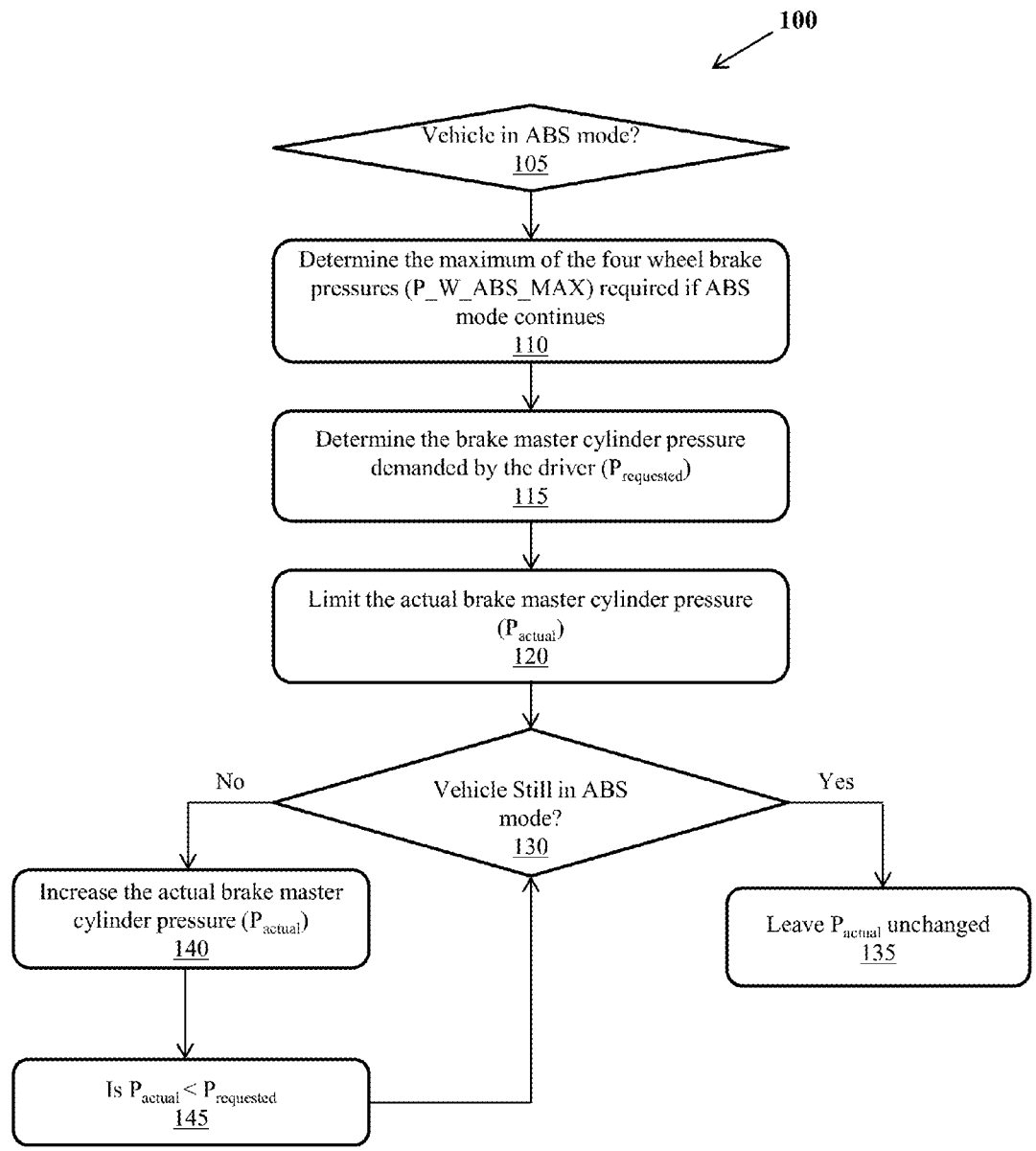
FIG. 1 is a flow chart showing the steps involved in a method for reducing the braking distance for a vehicle, in accordance with an embodiment of the present disclosure.

FIG. 1 shows a method 100 for reducing the braking distance of a vehicle equipped with a hydraulic braking system and an ABS mechanism, in accordance with the present disclosure. The method is implemented as soon as the driver of the vehicle applies the brakes to completely stop the vehicle. At step 105, the method determines whether the vehicle is in ABS mode. For this, the method checks whether one or more wheels of the vehicle is currently locked (i.e., ceases to rotate). Specifically, the vehicle is provided with an electronic control unit (ECU) and different wheel speed sensors coupled to the vehicle's wheels. The electronic control unit obtains inputs from the wheel sensors, to determine whether one or more wheels of the vehicle are locked up. If the vehicle is in ABS mode, then at step 110, the method determines the brake pressure required to lock each of the wheels, and the maximum of these wheels brake pressures required for locking. This value is denoted by P_W_ABS_MAX, as shown. For example, if the four different wheels of the vehicles get completely locked at brake pressure values of about 120 bar, 130 bar, 135 bar, and 118 bar, respectively, then the value of P_W_ABS_MAX is 135 bar. At step 115, the method determines the brake pressure requested by the driver of the vehicle ($P_{requested}$). Since the driver desires to stop the vehicle completely, the value of $P_{requested}$ may be much higher than P_W_ABS_MAX. The value of P_W_ABS_MAX is directly related to the force applied by the driver during pressing the brake pedal.

At step 120, the method limits the value of the actual brake master cylinder pressure ($P_{actual}$) on the vehicle's wheels. During limiting of the value of $P_{actual}$ at each of the wheels, the method keeps $P_{actual}$ at a level lower than the brake pressure requested by the driver ($P_{requested}$), but still higher than the maximum of the wheel brake pressures (P_W_ABS_MAX) determined earlier in step 110. For example, if the maximum of the wheel brake pressure values (P_W_ABS_MAX) is 135 bar, and the brake pressure requested by the driver is 190 bar, then the actual brake pressure value ($P_{actual}$) may be set at a level between 135 bar and 190 bar. The amount of reduction in the actual brake pressure ($P_{actual}$), with respect to the driver's requested brake pressure ($P_{requested}$), is such that the vehicle still remains in the ABS mode. In a preferred embodiment, for the aforementioned example, the value of $P_{actual}$ is set somewhere within the range of 136-145 bar, to assure that the vehicle still remains in ABS mode, and the actual brake master cylinder pressure ($P_{actual}$) is lower than the requested brake pressure ($P_{requested}$). However, in certain less preferred embodiments, the value of the $P_{actual}$ may also be roughly set to a level below $P_{demanded}$, considering the fact that during an emergency stopping event, the brake pressure requested by the driver is generally much higher than the brake pressure at which the different wheels of the vehicle get locked.

At step 130, the method checks whether the vehicle still remains in the ABS mode, after the value of the actual brake master cylinder pressure ($P_{actual}$) has been set to a level below the requested brake pressure ($P_{requested}$). If yes, then the value of $P_{actual}$, as set in step 120, is left unchanged at step 135. Else, if the vehicle leaves the ABS mode, then at step 140, the actual brake master cylinder pressure ($P_{actual}$) is increased in incremental steps, till the vehicle acquires the ABS mode again. While increasing the value of $P_{actual}$ at this step, the method still makes sure that $P_{actual}$ remains below or equal to the $P_{requested}$ By performing the check at step 130, the method confirms that the actual brake master cylinder pressure ($P_{actual}$) lies below the requested brake pressure ($P_{requested}$), and still at a value where the vehicle remains in ABS mode.

Conventionally, during an emergency stop, when the brakes are applied, the driver's requested brake pressure is higher than the brake pressure at which the wheels of the vehicle lock. Hence, the ABS needs to do a large amount of work to pump the excessive brake fluid out of the braking system, to prevent the wheels from getting locked. In the method of the present disclosure, as the actual brake pressure is reduced to a value much lower than the requested brake pressure, the ABS now needs to do a lower amount of work, comparatively. Therefore, the ABS can more finely and effectively control the brake pressure on each of the vehicle's wheels, ultimately leading to a better control over the wheel slip and the vehicle's speed.

Figure 2:
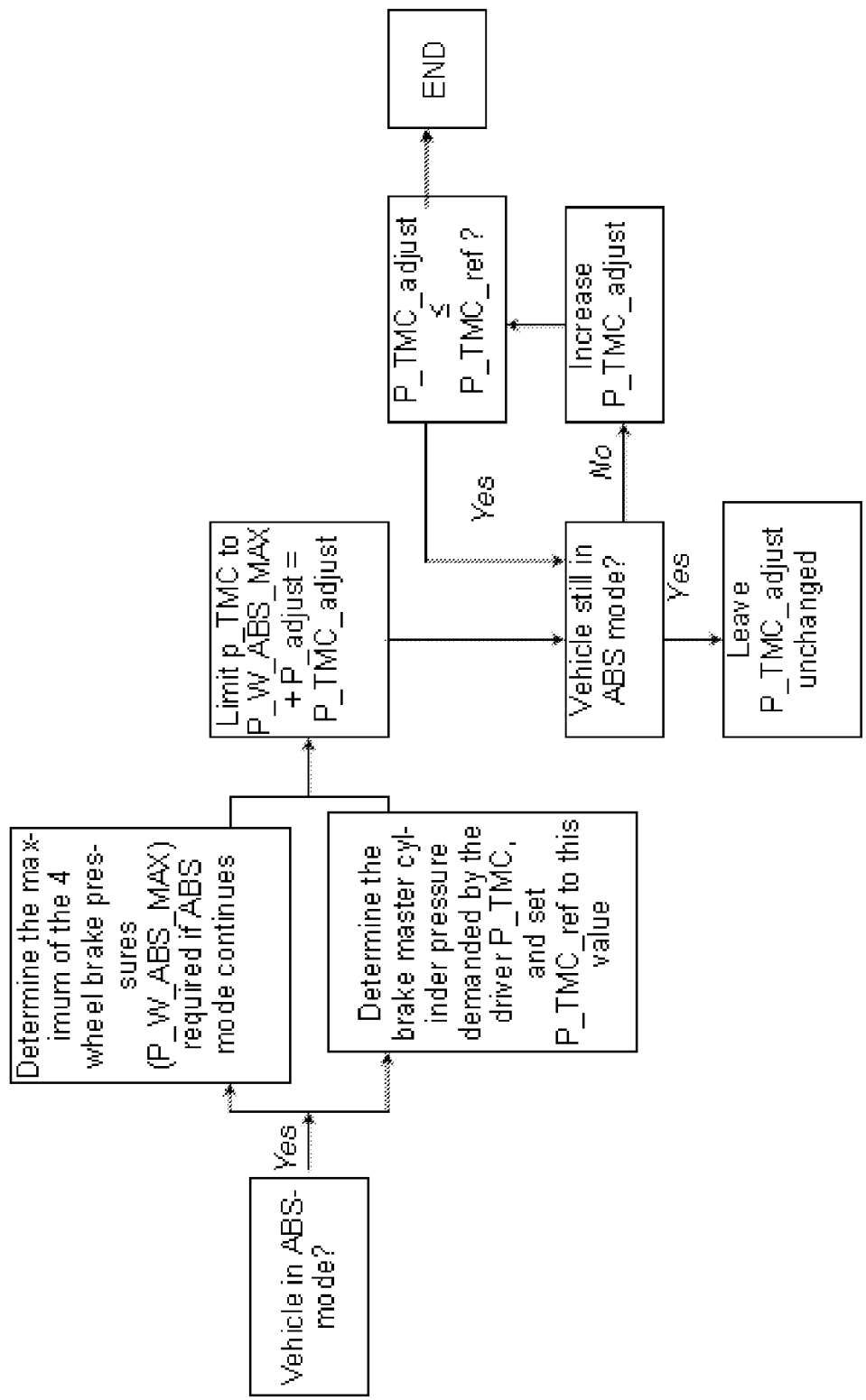
FIG. 2 is a schematic diagram illustrating the method of FIG. 1, for reducing the braking distance of a vehicle, in accordance with the present disclosure.

FIG. 2 is a flowchart illustrating a schematic diagram representing the method shown in FIG. 1, for reducing the braking distance for a vehicle. Although, some of the values referred earlier may have different denotations, the underlying concept remains the same as depicted earlier in conjunction with FIG. 1.

As shown, if the vehicle is in ABS mode, a highest brake pressure value (P_W_ABS_MAX), among the brake pressures required to lock each of the wheels of the vehicle, is calculated. In parallel, the brake pressure requested by the driver of the vehicle (P_TMC) is also identified. For further reference, this value is set to P_TMC_ref. Effectively, this value is the same as the brake pressure value denoted by $P_{requested}$ in FIG. 1. Thereafter, the actual brake pressure (P_TMC_adjust) is limited by a value P_adjust. Specifically, P_adjust represents the amount by which the actual brake pressure is reduced below the brake pressure demanded by the driver of the vehicle (P_TMC_ref). After reduction, it is checked whether the vehicle still remains in the ABS mode. If yes, then the actual brake pressure value (P_TMC_Adjust) is kept unchanged. On the other hand, if the vehicle leaves the ABS mode, then the actual brake pressure value (P_TMC_Adjust) is increased, approaching towards the driver's requested brake pressure value (P_TMC_ref) which was set as a reference value earlier. At every incremental increase, it is checked whether the vehicle reacquires the ABS mode. Eventually, the actual brake pressure value (P_TMC_Adjust) is set to a value where the vehicle acquires the ABS mode again.

Figure 3:
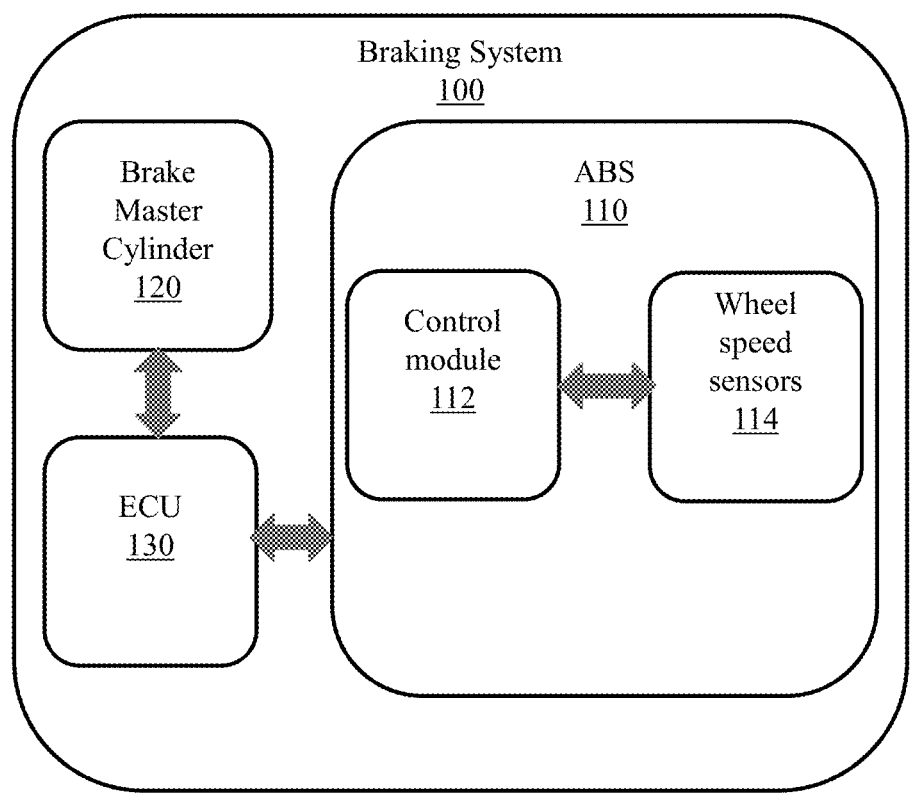
FIG. 3 illustrates a braking system for a vehicle incorporating a brake master cylinder, and configured to reduce the braking distance for the vehicle.

FIG. 3 shows a braking system 100 for a vehicle, for reducing the braking distance for the vehicle, as the brakes are applied during an emergency. The braking system 100 includes a brake master cylinder 120, and an anti-lock braking system (ABS) 110 coupled to the wheels of the vehicle. The ABS mechanism 110 includes wheel speed sensors 114 coupled to the different wheels of the vehicle. Each of the wheel speed sensors 114 is mounted at a specific wheel of the vehicle, and continuously monitors its rotational speed. A control module 112 is coupled to the wheel speed sensors 114, and receives signals from them. In a case where any of the sensors 114 detects a locking condition within a wheel, that sensor provides a corresponding signal to the control module 112, indicating that the wheel ceases to rotate. The control module 112 is coupled to the brake master cylinder 120. On receiving a wheel-locking signal from any of the wheel speed sensors 114, the control module 112 reduces the brake pressure applied by the brake master cylinder 120, to release the locking state of that wheel, and allow it to rotate. Further, on detecting such a condition, the ABS 110 actuates the hydraulic valves of the braking system 100, to reduce the hydraulic pressure applied to the brakes at the affected wheel. Similarly, in a case where a specific wheel is detected to rotate faster than the other wheels, the ABS 110 activates the hydraulic valves to affect an increase in the hydraulic pressure applied to the brakes of the affected wheel.

An electronic control unit 130 is coupled to the brake master cylinder 120 and the ABS 110. The electronic control unit 130 (referred to as 'unit 130' hereinafter) monitors the brake pressure requested ($P_{requested}$) by the driver of the vehicle, as soon as the driver applies the brakes to stop the vehicle. After the brakes are applied, when the vehicle gets into the ABS mode, the unit 130 calculates the brake pressure values at which the different wheels of the vehicle get locked. As aforementioned, these brake pressure values may be different for different wheels, and may depend upon certain factors, including the condition of each tire, and the level of adhesion between that tire and the road surface. Thereafter, the unit 130 calculates a maximum brake pressure value (P_W_ABS_MAX) out of these brakes pressure values for locking the different wheels. If the maximum brake pressure value P_W_ABS_MAX is much less than the brake pressure requested by the vehicle's driver ($P_{requested}$), then the electronic control unit 130 sets the actual brake pressure at the different wheels ($P_{actual}$) to a value lower than the requested brake pressure ($P_{requested}$), but still higher than P_W_ABS_MAX. Effectively, the brake master cylinder 120 is controllable through the electronic control unit 130, and the actual brake pressure produced by it, can be easily adjusted to a desired value. While reducing the actual brake pressure value ($P_{actual}$) a level below the requested brake pressure ($P_{requested}$), the electronic control unit 130 still ensures that the vehicle does not leave the ABS mode. In an embodiment, the reduction in the value of $P_{actual}$ may also be performed in sequential decrements, depending on the extent to which the requested brake pressure exceeds the maximum brake pressure value P_W_ABS_MAX.

After reducing the actual brake pressure ($P_{actual}$) to a value lower than the requested brake pressure ($P_{requested}$), the electronic control unit 130 continuously checks whether any of the wheels of the vehicle have left the ABS mode, due to the pressure reduction. More specifically, the unit 130 checks whether any of the vehicle's wheels starts rotating again, after reducing the actual brake pressure value ($P_{actual}$). If the vehicle's wheels still remain in the ABS mode, then the value of the actual brake pressure ($P_{actual}$) is kept unchanged. Else, if any of the wheels leaves the ABS mode, then the unit 130 increases the actual brake pressure value ($P_{actual}$). This is done to ensure that the vehicle acquires the ABS mode again. While increasing the actual brake pressure value ($P_{actual}$), the electronic control unit 130 makes sure that the amount of increase still keeps $P_{actual}$ below the driver's requested brake pressure ($P_{requested}$).

Effectively, since the unit 130 has reduced the actual brake pressure value ($P_{actual}$) to a level lower than the requested brake pressure ($P_{requested}$), and the wheels of the vehicle still remain locked, the unit 130 has effectively reduced the work required to be done by the ABS 110, in reducing the brake pressure to a level where it prevents the wheels from locking. For example, in a case where the requested brake pressure is 190 bar, and the maximum brake pressure value at which any of the wheels of the vehicle gets locked is 150 bars, the unit 130 may reduce the actual brake pressure to a value of about 160 bars. Now, the ABS 110 has to reduce the actual brake pressure from a value of 160 bars to about 149 bars, to prevent that wheel from locking, contrary to a case where it had to reduce it all the way from 190 bars. Hence, this reduces the amount of work to be done by the ABS 110 in reducing the excessive brake fluid out of the braking system 100 of the vehicle, as the brakes are applied to stop the vehicle during an emergency. Effectively, the load on ABS 110 is substantially reduced, and this allows the ABS 110 to have a finer and more precise control of the individual wheel brake pressures and wheel slip conditions.

The method and the system of the present disclosure can be effectively implemented to control a vehicle equipped with a hydraulic braking system, and reduce the braking distance for the vehicle. Specially, the method and the system are significantly effective in reducing the braking distance for the vehicle on a slippery low friction surface, when the brakes are fully applied. Further, the method and the system can be easily incorporated in any type of vehicle, including cars, trucks, buses, SUVs, etc.

Although the current invention has been described comprehensively, in considerable details to cover the possible aspects and embodiments, those skilled in the art would recognize that other versions of the invention might also be possible.

What is claimed is:

1. A method of reducing the braking distance of a vehicle, wherein the vehicle includes a braking system, the braking system having a brake master cylinder coupled to an electronic control unit, and an Anti-lock braking system (ABS) module, the method comprising:
    determining whether the brake pressure requested by the vehicle's driver exceeds a wheel lock brake pressure at which at least one of the wheels of the vehicle locks up, employing the electronic control unit;
    activating the brake master cylinder when the requested brake pressure exceeds the wheel lock brake pressure, to reduce the brake pressure produced by the brake master cylinder to a value lower than the brake pressure requested by the driver;
    sensing whether more than one of the vehicle's wheels are locked, employing wheel speed sensors coupled to the wheels;
    calculating individual brake pressure values required to keep each of the more than one wheels locked, employing the electronic control unit; and
    identifying a maximum value among the individual brake pressure values, employing the electronic control unit, and adjusting the brake pressure produced by the brake master cylinder to a value between the brake pressure requested by the driver and the maximum values by signaling the brake master cylinder.

2. The method of claim 1, further comprising, during the reduction, maintaining the brake pressure produced by the master cylinder to a level higher than the wheel lock brake pressure at which the wheel locks up.

3. The method of claim 1, further comprising, using the ABS module to further reduce the brake pressure produced by the master cylinder at the wheel, to a value lower than the wheel lock brake pressure.

\* \* \* \* \*